P. H. THOMAS.
SYSTEM OF ELECTRIC DISTRIBUTION.
APPLICATION FILED JAN. 21, 1903. RENEWED FEB. 21, 1907.

901,306.

Patented Oct. 13, 1908

Witnesses
Chas. J. Clagett
George H. Stockbridge

Inventor
Percy H. Thomas
By his Attorney
Charles A. Terry

UNITED STATES PATENT OFFICE.

PERCY H. THOMAS, OF PITTSBURG, PENNSYLVANIA, ASSIGNOR TO COOPER HEWITT ELECTRIC COMPANY, A CORPORATION OF NEW YORK.

SYSTEM OF ELECTRIC DISTRIBUTION.

No. 901,306.　　　Specification of Letters Patent.　　　Patented Oct. 13, 1908.

Application filed January 21, 1903, Serial No. 139,875. Renewed February 21, 1907. Serial No. 358,727.

*To all whom it may concern:*

Be it known that I, PERCY H. THOMAS, a citizen of the United States, and a resident of Pittsburg, in the county of Allegheny and State of Pennsylvania, have invented certain new and useful Improvements in Systems of Electric Distribution, of which the following is a specification.

My invention relates to certain improvements in organizations of apparatus for obtaining a flow of current in a given direction from sources of alternating electric currents.

In certain patents issued to Peter Cooper Hewitt on the 17th day of September, 1901, there are described forms of apparatus which permit the passage of electric currents in a given direction while opposing a material resistance to flow of current in the opposite direction. My invention aims to utilize this phenomenon in a system of electrical distribution.

Figure 1:
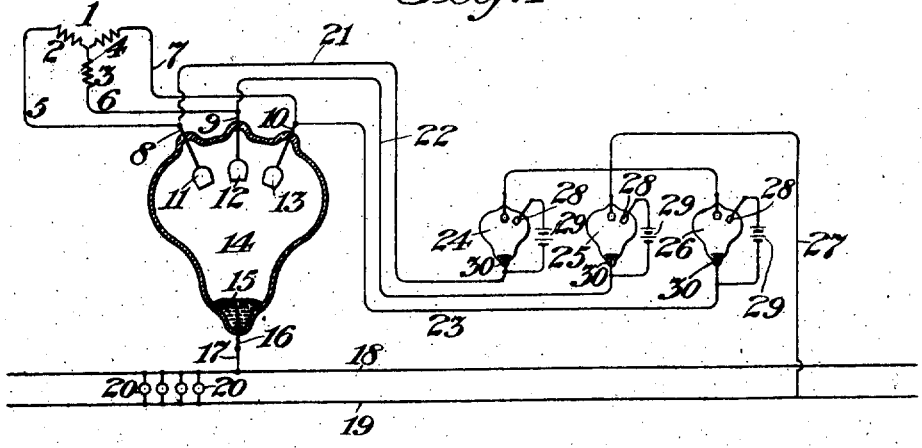
Figure 2:
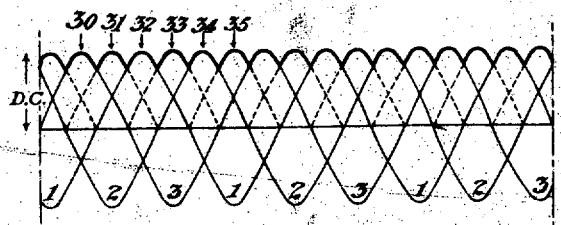

In Figure 1 of the accompanying drawings, I have illustrated in diagram an apparatus for carrying out the invention; and Fig. 2 is a diagram showing the time curves of the electro-motive-force relations.

Referring to Fig. 1 of the drawings, 1 represents a suitable source of alternating current, in this instance a three-phase generator. The coils, 2, 3 and 4, of the generator are, respectively, connected with conductors, 5, 6 and 7. These conductors are carried, respectively, to lead-wires, 8, 9 and 10, leading to positive electrodes, 11, 12 and 13, inside the container, 14, of a vapor apparatus having a negative electrode, 15. The latter is joined through its lead-wire, 16, and a conductor, 17, to one main, 18, of a work circuit, the opposite main of which is shown at 19. The work circuit contains translating devices, 20, 20, which may be any devices adapted to be operated upon a current of uniform direction. The electrodes, 11, 12 and 13 may conveniently be of iron, copper or mercury, while the electrode 15 may consist of a small quantity of mercury. The conductors 5, 6 and 7 are, respectively, connected to branches, 21, 22 and 23, leading to the mercury or negative electrodes, respectively, of vapor devices, 24, 25 and 26. These devices are provided with positive electrodes which are all connected together, the connecting wire being joined by a conductor, 27, with the main 19 of the work circuit.

Each of the devices 24, 25 and 26 may be provided with a supplemental electrode, 28, connected with the positive terminal of a source of direct current, 29, the opposite terminal of which is connected with the corresponding terminal, 30, connected with the negative electrode of the same device. The vapor device, 14, may be similarly provided with means for keeping the device alive, that is to say, maintaining a continuous flow of current in one direction therethrough.

In operating the device there is initially a reluctance to starting which may be overcome in any convenient manner, as for instance, by some of the methods described in the Hewitt patents before referred to, or in any other convenient way, and this resistance having been once overcome will remain overcome as long as the current continues to flow in the same direction. Such flow may be obtained in the present instance from the direct current source 29, referred to, or from any other suitable source of electro-motive-force which may be called upon to deliver currents or impulses in the proper direction at the proper time.

In the operation of the apparatus, each positive wave of the electro-motive-force from the generator 1 will traverse the vapor device 14 thus reaching the work circuit and will find a return circuit through one or more of the devices 24, 25 and 26. Similarly, each negative wave will reach the work circuit through one or more of the generator windings passing through the device 14 and returning through one of the devices 24, 25, 26, through its corresponding lead. The resulting flow of current through the work circuit is always in the same direction. The device 14 having three positive electrodes and a common negative electrode inclosed in a single container is manifestly the equivalent of a group of devices generally similar to the devices 24, 25 and 26 wherein each positive electrode is mounted in a separate container opposite its own negative electrode.

When a source of alternating currents is mentioned, it may be understood to means either an alternating generator or a transformer or equivalent device constituting the feeder for the supply circuit.

It will be observed by reference to Fig. 2 that the resulting flow of energy in the work circuit is much more constant than would result if only the waves in a given direction were effectively employed. It has heretofore been proposed to connect the return circuit with a neutral point of the source and use only the electro-motive-forces in one direction. By reference to Fig. 2, it will be seen that the resulting flow of energy will be more or less pulsating, due to the rise and fall of the electro-motive-force applied to one device before the succeeding wave is transmitted through the successive device.

In the diagram Fig. 2, the curves marked 30, 32, 34, would represent diagrammatically the flow of energy if the positive impulses alone were employed, whereas when the negative impulses are also employed the flow of energy due to the negative impulses is represented by the curves 31, 33 and 35, so that the resulting flow of energy will be represented by the configuration of the upper curve of Fig. 2. This for convenience is represented in the diagram by the heavy lines.

It will be understood that the diagram indicating the time curves of the electro-motive-forces is theoretical and that the relative positions and relations of the waves may be more or less modified by inductive and other effects. It will also be understood that the arrangement herein shown and described is applicable to supply circuits of any number of phases, and also to a plurality of supply circuits, either in or out of synchronism.

It has been convenient to describe the system of distribution herein disclosed as embodying, among its principal features, a gas or vapor electrical apparatus of the general character of the Cooper Hewitt lamp. It will be understood that this device has been selected for purposes of illustration, and that the invention, broadly, is not limited to the employment of a device of that specific character.

It is found convenient to designate those gas or vapor electric devices which are connected to the positive side of the work circuit as "positively connected" devices and those devices connected to the negative side of the work circuit as "negatively connected" devices.

In a divisional application, filed September 9, 1908, Serial Number 452,241, claim is made to certain other features of the system herein described.

I claim as my invention:

1. The combination with a source of alternating electric currents, of an inclosed gas or vapor, a work circuit, multiple positive electrodes and a single negative electrode, connections from the several positive electrodes with the respective alternating current leads, a connection from the negative electrode to one side of a work circuit, multiple devices containing an inclosed gas or vapor each having one electrode connected with the negative side of the work circuit and the remaining electrodes connected with the respective alternating current leads, and means for providing a continuous flow of current in a given direction through each of said devices.

2. The combination with a source of three-phase alternating currents, of a work circuit, an inclosed gas or vapor, three positive electrodes and a single negative electrode therein, connections from the several positive electrodes with the respective alternating current leads, a connection from the negative electrode to one side of said work circuit, with multiple devices each including an inclosed gas or vapor and each having one electrode connected with the other side of the work circuit and another electrode connected with one of the alternating current leads, together with means for providing a continuous flow of current in a given direction through each of said devices.

Signed at New York, in the county of New York, and State of New York, this 19th day of January, A. D. 1903.

PERCY H. THOMAS.

Witnesses:
WM. H. CAPEL,
GEORGE H. STOCKBRIDGE.